United States Patent
Shirai (10) Patent No.: US 11,004,470 B2
(45) Date of Patent: May 11, 2021

(54) CONTENT REPRODUCTION DEVICE, CONTENT REPRODUCTION METHOD, AND CONTENT REPRODUCTION SYSTEM

(71) Applicant: YAMAHA CORPORATION, Hamamatsu (JP)

(72) Inventor: Masakazu Shirai, Toyohashi (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/559,873

(22) Filed: Sep. 4, 2019

(65) Prior Publication Data
US 2019/0392865 A1   Dec. 26, 2019

Related U.S. Application Data (63) Continuation of application No. PCT/JP2017/010955, filed on Mar. 17, 2017.

(51) Int. Cl.
G11B 27/02 (2006.01)
G11B 27/34 (2006.01)

(52) U.S. Cl.
CPC ............ *G11B 27/02* (2013.01); *G11B 27/34* (2013.01)

(58) Field of Classification Search
CPC ....... G11B 27/02; G11B 27/34; G11B 27/034; G11B 27/036; G11B 27/038; G11B 27/105
See application file for complete search history.

(56) References Cited

U.S. PATENT DOCUMENTS

| 8,458,616 B2 * | 6/2013 | Kinouchi | G11B 27/105 715/716 |
| 2005/0195696 A1 * | 9/2005 | Rekimoto | G11B 27/105 369/30.08 |

(Continued)

FOREIGN PATENT DOCUMENTS

| JP | 4891407 B2 | 3/2012 |
| JP | 4952433 B2 | 6/2012 |

(Continued)

OTHER PUBLICATIONS

International Search Report issued in Intl. Appln. No. PCT/JP2017/010955 dated Jun. 20, 2017. English translation provided.

(Continued)

*Primary Examiner* — Thai Q Tran
*Assistant Examiner* — Jose M Mesa
(74) *Attorney, Agent, or Firm* — Rossi, Kimms & McDowell LLP (57) ABSTRACT

Provided is a content reproduction device including: a controller configured to: acquire playlist information indicating a reproduction order position of plural pieces of content; acquire reproduction requirement information indicating a condition required for reproduction of each piece of content; acquire reproduction enabling condition information indicating a condition for enabling the reproduction on the content reproduction device; and determine based on the reproduction requirement information and the reproduction enabling condition information whether each of piece of content is reproducible on the content reproduction device; and a storage configured to store information that is based on a determination result obtained by the controller. The controller skip reproducing a piece of content that is irreproducible on the content reproduction device in accordance with the information that is based on the determination result (Continued)

and reproduce another one of the plural pieces of content that is reproducible on the content reproduction device.

20 Claims, 11 Drawing Sheets

(56) References Cited

U.S. PATENT DOCUMENTS

| | | | |
|---|---|---|---|
| 2007/0112940 A1* | 5/2007 | Morisawa | G06F 16/64 709/219 |
| 2008/0109852 A1 | 5/2008 | Kretz | |
| 2009/0042508 A1 | 2/2009 | Wakasa | |
| 2009/0241149 A1* | 9/2009 | Yoshioka | H04N 21/23 725/87 |
| 2011/0032327 A1 | 2/2011 | Ikeda | |
| 2012/0198354 A1 | 8/2012 | Wakasa | |
| 2012/0201515 A1* | 8/2012 | Kanemaru | H04N 13/183 386/248 |
| 2014/0011454 A1 | 1/2014 | Wakasa | |
| 2014/0330932 A1 | 11/2014 | Wakasa | |
| 2016/0234274 A1 | 8/2016 | Kretz | |
| 2017/0105042 A1 | 4/2017 | Toma | |
| 2017/0251161 A1 | 8/2017 | Toma | |
| 2019/0238788 A1 | 8/2019 | Toma | |

FOREIGN PATENT DOCUMENTS

| | | |
|---|---|---|
| JP | 2015043492 A | 3/2015 |
| JP | 2017022717 A | 1/2017 |
| WO | 2010143439 A1 | 12/2010 |
| WO | 2013031307 A1 | 3/2013 |

OTHER PUBLICATIONS

Written Opinion issued in Intl. Appln. No. PCT/JP2017/010955 dated Jun. 20, 2017.

Office Action issued in Japanese Appln. No. 2019-505651 dated Jun. 18, 2019. English translation provided.

English translation of Written Opinion issued in Intl. Appln. No. PCT/JP2017/010955 dated Jun. 20, 2017, previously cited in IDS filed Sep. 4, 2019.

International Preliminary Report on Patentability issued in Intl. Appln. No. PCT/JP2017/010955 dated Sep. 26, 2019. English translation provided.

* cited by examiner

PLAYLIST

| ORDER POSITION | SERVICE | TITLE | ARTIST | ADDRESS INFORMATION |
|---|---|---|---|---|
| 1 | A | AAAA | Aaaa | http://.... |
| 2 | B | BBBB | Bbbb | https://.... |
| 3 | C | CCCC | Cccc | http://.... |
| 4 | DLNA | DDDD | Dddd | — |

FIG.5

METADATA

| TITLE | AAAA |
|---|---|
| ARTIST | Aaaa |
| FORMAT | MP3 |
| BIT RATE | 128kbps |

FIG.6

REPRODUCTION ENABLING CONDITION

| FORMAT | WAV<br>MP3<br>AAC<br>WMA | | |
|---|---|---|---|
| SAMPLING RATE<br>/BIT RATE | WAV | 96kHz<br>88.2kHz<br>48kHz<br>44.1kHz | 24bit<br>16bit |
| | MP3 | 320kbps<br>192kbps<br>128kbps<br>64kbps<br>32kbps | |
| SERVICE | A | Account | aaaaaa |
| | | Password | xxxxxx |
| | B | Account | bbbbbb |
| | | Password | xxxxxx |
| | C | Account | cccccc |
| | | Password | xxxxxx |

FIG.7A (SUPPORTED SERVICE : A, C, DLNA)

| ORDER POSITION | SERVICE | TITLE | ARTIST | ADDRESS INFORMATION |
|---|---|---|---|---|
| 1 | A | AAAA | Aaaa | http://.... |
| 3 | C | CCCC | Cccc | http://.... |
| 4 | DLNA | DDDD | Dddd | — |

FIG.7B (SUPPORTED SERVICE : A, B, DLNA)

| ORDER POSITION | SERVICE | TITLE | ARTIST | ADDRESS INFORMATION |
|---|---|---|---|---|
| 1 | A | AAAA | Aaaa | http://.... |
| 4 | DLNA | DDDD | Dddd | — |

FIG.8A (SUPPORTED SERVICE : A, C, DLNA)

| ORDER POSITION | SERVICE | TITLE | ARTIST | ADDRESS INFORMATION | FLAG |
|---|---|---|---|---|---|
| 1 | A | AAAA | Aaaa | http://.... | Yes |
| 2 | B | BBBB | Bbbb | https://... | No |
| 3 | C | CCCC | Cccc | http://.... | Yes |
| 4 | DLNA | DDDD | Dddd | — | Yes |

FIG.8B (SUPPORTED SERVICE : A, B, DLNA)

| ORDER POSITION | SERVICE | TITLE | ARTIST | ADDRESS INFORMATION | FLAG |
|---|---|---|---|---|---|
| 1 | A | AAAA | Aaaa | http://.... | Yes |
| 2 | B | BBBB | Bbbb | https://... | Yes |
| 3 | C | CCCC | Cccc | http://.... | No |
| 4 | DLNA | DDDD | Dddd | — | Yes |

FIG.9

(SUPPORTED SERVICE : A, C, DLNA)

| ORDER POSITION | SERVICE | TITLE | ARTIST | ADDRESS INFORMATION |
|---|---|---|---|---|
| 1 | A | AAAA | Aaaa | http://.... |
| 2 | A | BBBB | Bbbb | http://.... |
| 3 | C | CCCC | Cccc | http://.... |
| 4 | DLNA | DDDD | Dddd | — |

FIG.11

CONTENT REPRODUCTION DEVICE, CONTENT REPRODUCTION METHOD, AND CONTENT REPRODUCTION SYSTEM

CROSS-REFERENCE TO RELATED APPLICATION

The present application is a continuation of International Application No. PCT/JP2017/010955 filed on Mar. 17, 2017. The contents of the application are hereby incorporated by reference into this application.

BACKGROUND

1. Field

The present disclosure relates to a content reproduction device, a content reproduction method, and a content reproduction system.

2. Description of the Related Art

In JP 4891407 B2, there is disclosed a technology for enabling a first electronic device and a second electronic device to automatically establish a communication link therebetween and the first electronic device to transfer a playlist or other such session data to the second electronic device.

Incidentally, playlist information sometimes includes a piece of content that cannot be reproduced by a content reproduction device. In that case, the content reproduction device attempts to reproduce the piece of content that cannot be reproduced every time the playlist information is used, which leads to much waste.

SUMMARY

The present disclosure has been made in view of the above-mentioned problem, and has an object to provide a content reproduction device, a content reproduction method, and a content reproduction system, which are capable of suppressing waste due to a piece of content that cannot be reproduced.

In order to solve the above-mentioned problem, a content reproduction device according to at least one embodiment of the present disclosure includes: a controller configured to: acquire playlist information indicating a reproduction order position of plural pieces of content; acquire reproduction requirement information indicating a condition required for reproduction of each of the plural pieces of content; acquire reproduction enabling condition information indicating a condition for enabling the reproduction on the content reproduction device; and determine based on the reproduction requirement information and the reproduction enabling condition information whether each of the plural pieces of content is reproducible on the content reproduction device; and a storage configured to store information that is based on a determination result obtained by the controller. The controller is configured to skip reproducing one of the plural pieces of content that is irreproducible on the content reproduction device in accordance with the information that is based on the determination result and reproduce another one of the plural pieces of content that is reproducible on the content reproduction device in accordance with the information.

A content reproduction method according to at least one embodiment of the present disclosure includes: acquiring playlist information indicating a reproduction order position of plural pieces of content; acquiring reproduction requirement information indicating a condition required for reproduction of each of the plural pieces of content; acquiring reproduction enabling condition information indicating a condition for enabling the reproduction on a content reproduction device; determining based on the reproduction requirement information and the reproduction enabling condition information whether each of the plural pieces of content is reproducible on the content reproduction device; storing information that is based on a determination result; and skipping reproducing one of the plural pieces of content that is irreproducible on the content reproduction device in accordance with the information that is based on the determination result and reproducing another one of the plural pieces of content that is reproducible on the content reproduction device in accordance with the information.

A content reproduction system according to at least one embodiment of the present disclosure includes a first content reproduction device and a second content reproduction device. The first content reproduction device includes: a first controller configured to: acquire playlist information indicating a reproduction order position of plural pieces of content; acquire reproduction requirement information indicating a condition required for reproduction of each of the plural pieces of content; acquire reproduction enabling condition information indicating a condition for enabling the reproduction on the first content reproduction device; and determine based on the reproduction requirement information and the reproduction enabling condition information whether each of the plural pieces of content is reproducible on the first content reproduction device; and a first storage configured to store information that is based on a determination result obtained by the first controller. The first controller is configured to skip reproducing one of the plural pieces of content that is irreproducible on the first content reproduction device in accordance with the information that is based on the determination result and reproduce another one of the plural pieces of content that is reproducible on the content reproduction device in accordance with the information. The second content reproduction device is configured to acquire the information that is based on the determination result from the first content reproduction device.

DETAILED DESCRIPTION

At least one embodiment of the present invention is described with reference to the drawings.

[1. System Configuration]

Figure 1:
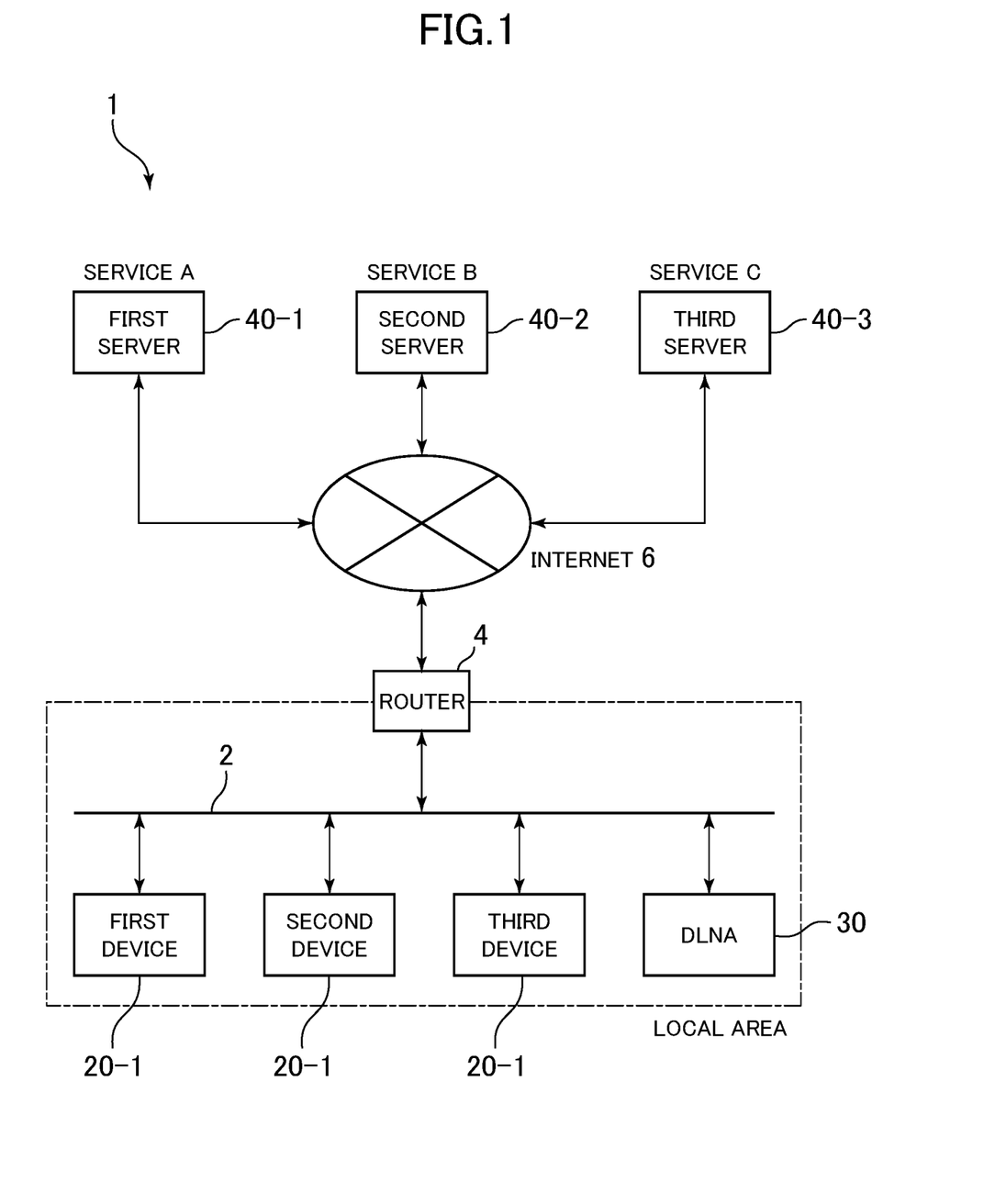
FIG. 1 is a diagram for illustrating a configuration example of a content reproduction system according to at least one embodiment of the present disclosure.

FIG. 1 is a diagram for illustrating a configuration example of a content reproduction system 1. The content reproduction system 1 includes a first device 20-1, a second device 20-2, and a third device 20-3 as content reproduction devices. In the following description, the first device 20-1, the second device 20-2, and the third device 20-3 may be referred to collectively as "device 20".

The content reproduction system 1 also includes a Digital Living Network Alliance (DLNA) (trademark) server 30, a first server 40-1, a second server 40-2, and a third server 40-3 as providing sources for providing content data to the device 20. In the following description, the first server 40-1, the second server 40-2, and the third server 40-3 may be referred to collectively as "external server 40".

The device 20 and the DLNA server 30 are installed in a local area and connected to a local area network (LAN) 2. The LAN 2 may be a wired LAN, or may be a wireless LAN. The LAN 2 is connected to the Internet 6 through a router 4. The external server 40 is installed outside the local area and connected to the Internet 6. The "local area" refers to an area within a limited range that allows communication through the LAN 2.

The device 20 is an audio device or an audiovisual device, for example, an AV receiver, an AV amplifier, a speaker, an optical disc reproduction device (e.g., Blu-ray Disc (trademark) player or DVD (trademark) player), or a television receiver. In FIG. 1, three devices 20 are illustrated, but the number of devices 20 may be equal to or larger than four, or may be equal to or smaller than two.

The external server 40 is formed of, for example, a server computer that functions as a Web server, and implements a service for providing the device 20 with content data in response to a request received from the device 20 (for example, music streaming distribution service). The first server 40-1, the second server 40-2, and the third server 40-3 implement services A to C, respectively, which are independent of one another.

Figure 2:
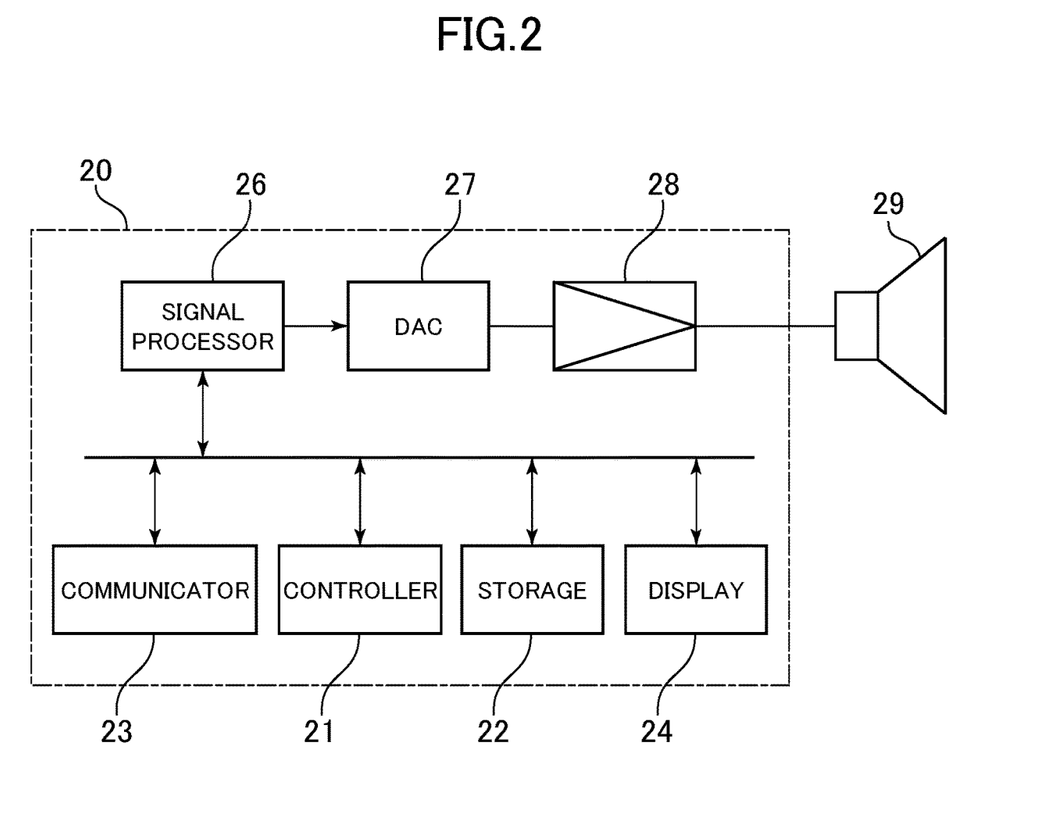
FIG. 2 is a diagram for illustrating a configuration example of a content reproduction device according to at least one embodiment.

FIG. 2 is a block diagram for illustrating a configuration example of the device 20. The device 20 includes a controller 21, a storage 22, a communicator 23, a display 24, a signal processor 26, a digital-to-analog converter (DAC) 27, and an amplifier 28, and is connected to a speaker 29.

The controller 21 includes at least one microprocessor (CPU), and is configured to execute processing in accordance with programs stored in the storage 22. The storage 22 includes a main storage (e.g., a RAM) and an auxiliary storage (e.g., a nonvolatile semiconductor memory, a hard disk drive, or a solid-state drive). The storage 22 is configured to store programs and data. The communicator 23 is configured to transmit/receive data to/from other devices.

The device 20 may include a component (e.g., an optical disc drive or a memory card slot) configured to read programs and data stored in an information storage medium (e.g., an optical disc or a memory card). Further, the programs may be supplied to the devices 20 through the information storage medium. The programs may be supplied to the devices 20 through the Internet 6.

The signal processor 26 performs predetermined signal processing on an input audio signal, and outputs the processed audio signal to the DAC 27. The DAC 27 converts the input audio signal from a digital signal into an analog signal, and outputs the converted audio signal to the amplifier 28. The amplifier 28 amplifies the input audio signal, and outputs the amplified audio signal to the speaker 29.

The device 20 reproduces a piece of content based on the content data provided from the DLNA server 30 or the external server 40. The content is, for example, audio content, and the content data includes the audio signal.

The device 20 reproduces a piece of content based on a reproduction order position described in playlist information. The playlist information is stored in the storage 22, and is read by the controller 21.

Figure 3:
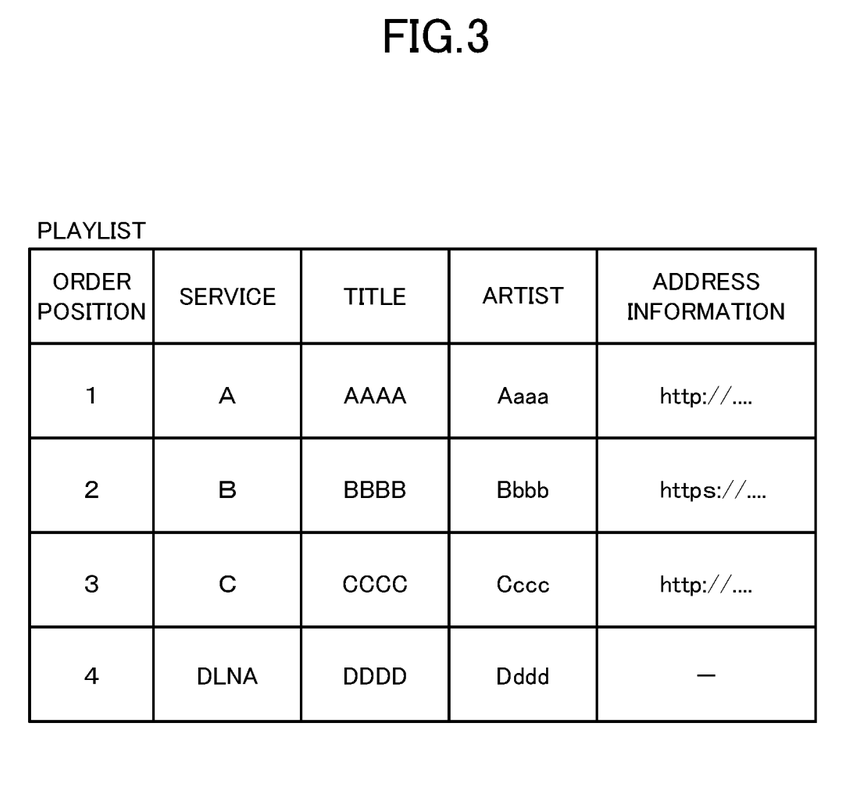
FIG. 3 is a table for showing an example of playlist information.

As shown in FIG. 3, the playlist information includes, for example, "order position", "service", "title", "artist", and "address information" fields. The value of the "order position" indicates the reproduction order position of the content.

The value of the "service" indicates the providing source of the content data. In the example of FIG. 3, "A" represents the service A implemented by the first server 40-1, "B" represents the service B implemented by the second server 40-2, and "C" represents the service C implemented by the third server 40-3. In addition, "DLNA" represents the DLNA server 30.

In this case, the value of the "service" indicates that the device 20 is required to have an authorization to use the service in order to reproduce the content, and is an example of a reproduction requirement, which is described later. For example, the value of the "service" being "A" indicates that the device 20 is required to have an authorization to use the service A in order to reproduce the content.

The values of the "title" and the "artist" indicate attributes (for example, song name and performer) of the content, and are used as keys for identifying the content data when the content data is acquired from the DLNA server 30 or the external server 40.

The value of the "address information" indicates a location of the providing source of the content data on a network. In the example of FIG. 3, locations of the first server 40-1 for implementing the service A, the second server 40-2 for implementing the service B, and the third server 40-3 for implementing the service C on the Internet 6 are each expressed by a uniform resource locator (URL).

The device 20 may create playlist information by itself, or may acquire playlist information from another device 20 through the LAN 2. The device 20 may also acquire playlist information from a smartphone, a tablet computer, or other such terminal, or from a server computer or other such device on the Internet 6.

Incidentally, the playlist information acquired in this manner sometimes includes a piece of content that cannot be reproduced by the device 20. In view of this, in at least one embodiment, a configuration and an operation described below are employed to restrict the reproduction of the piece of content that cannot be reproduced.

[2. Functional Blocks]

Figure 4:
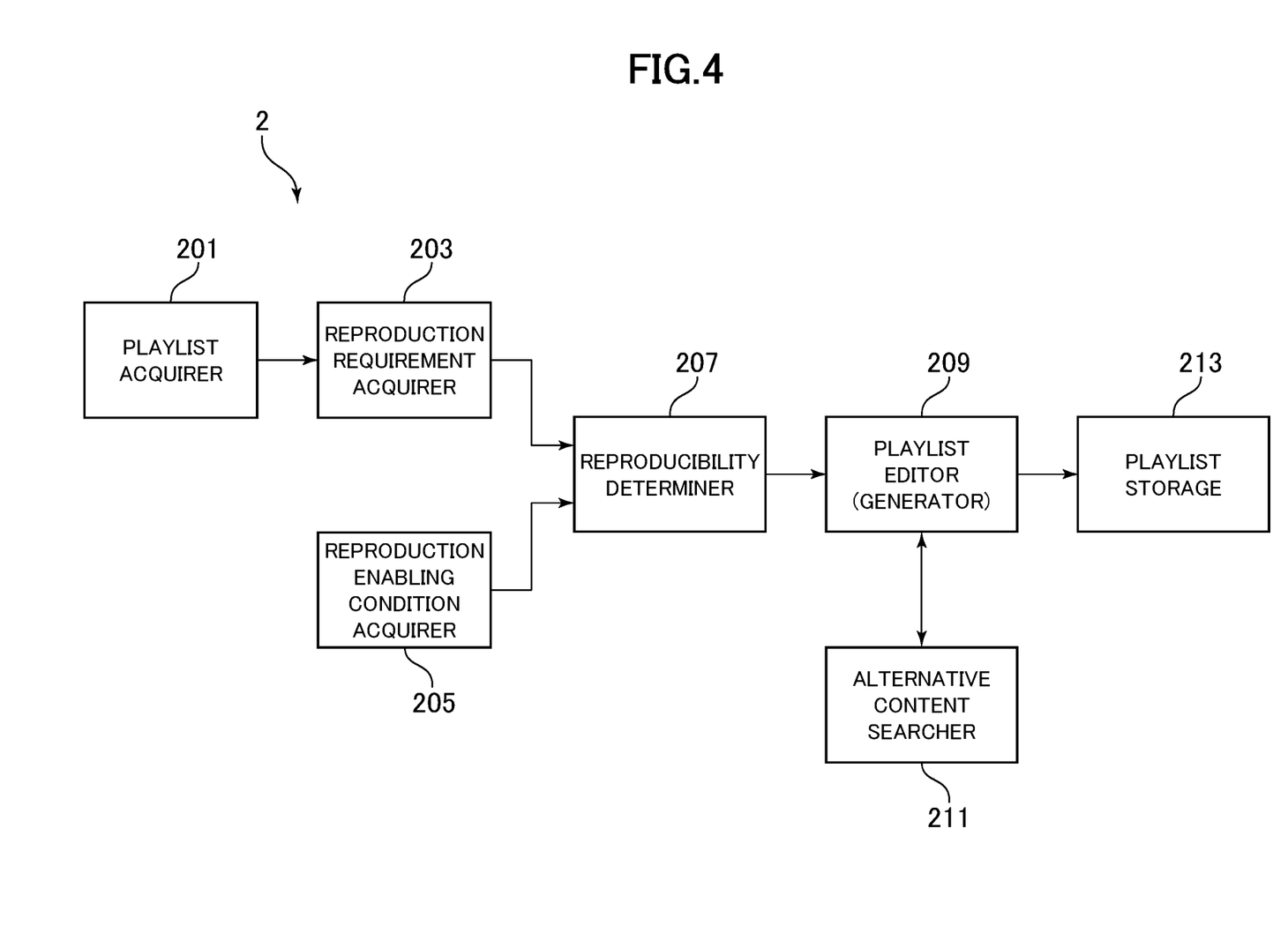
FIG. 4 is a diagram for illustrating an example of functional blocks implemented by the content reproduction device.

FIG. 4 is a diagram for illustrating an example of functional blocks implemented by the device 20. The device 20 includes a playlist acquirer 201, a reproduction requirement acquirer 203, a reproduction enabling condition acquirer 205, a reproducibility determiner 207, a playlist editor 209, an alternative content searcher 211, and a playlist storage 213. Those functional blocks are implemented by the controller 21 executing processing in accordance with a program stored in the storage 22.

The playlist acquirer 201 acquires playlist information. Specifically, the playlist acquirer 201 reads playlist information stored in the storage 22. In at least one embodiment, the playlist information is, for example, provided from another device 20 or other such source and stored in the storage 22.

The reproduction requirement acquirer 203 acquires reproduction requirement information indicating a condition required for reproducing each piece of content included in the playlist information acquired by the playlist acquirer 201. In this case, a condition required for reproducing each piece of content (hereinafter referred to as "reproduction requirement") represents, for example, a format of the content data, a sampling rate or a bit rate of the content data, and a name or other such information on a service for providing the content data.

In order to reproduce the content, the device 20 is required to support the format of the content data. Therefore, the format of the content data is an example of the reproduction requirement. Examples of the format of the content data include WAV, MP3, AAC, and WMA.

The device 20 is also required to support the sampling rate or the bit rate of the content data in order to reproduce the content. Therefore, the sampling rate or the bit rate of the content data is an example of the reproduction requirement. The content data of WAV has a sampling rate of, for example, 44.1 kHz and 16 bits. The content data of MP3, AAC, or WMA has a bit rate of, for example, 128 kbps.

Figure 5:
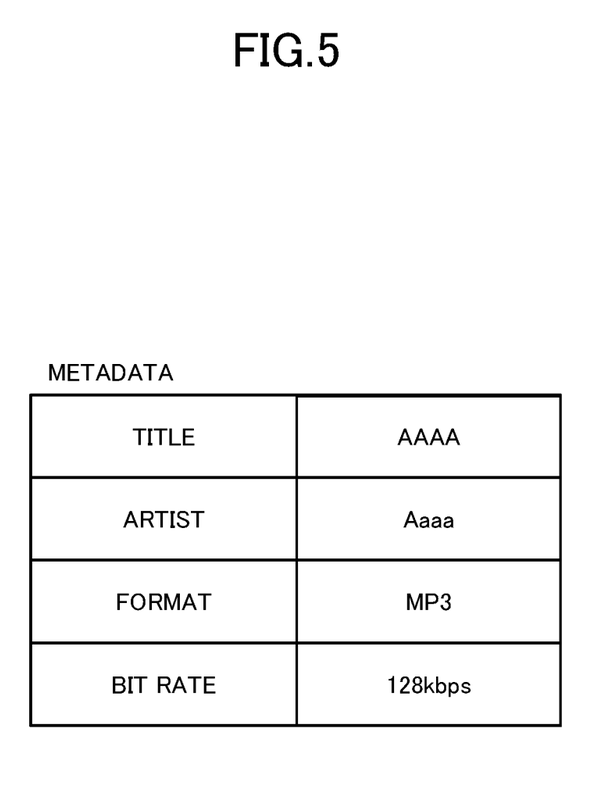
FIG. 5 is a table for showing an example of metadata.

The reproduction requirement acquirer 203 acquires a part of reproduction requirements, specifically, the format of the content data and the sampling rate or the bit rate of the content data, from metadata on the content data. As shown in FIG. 5, the metadata includes, for example, the items of a "title", an "artist", a "format", and a "bit rate". The reproduction requirement acquirer 203 identifies desired metadata based on the values of the "title" and the "artist", and acquires the values of the "format" and the "bit rate" as the reproduction requirements.

The example of FIG. 5 is an example of metadata on a given piece of content having the "title" being "AAAA" and the "artist" being "Aaaa", which is included as the first record of the above-mentioned playlist information shown in FIG. 3. In this case, the reproduction requirement acquirer 203 accesses the first server 40-1 for implementing the service A based on the values of the "service" and the "address information" associated with the given piece of content in the playlist information to acquire the metadata on the given piece of content having the "title" being "AAAA" and the "artist" being "Aaaa".

The reproduction requirement acquirer 203 acquires another part of the reproduction requirements, specifically, the name or other such information on the service for providing the content data, from the playlist information. The information indicates a service for which the device 20 is required to have a use authorization (account) when the given piece of content is to be reproduced, and corresponds to the value of the "service" in the above-mentioned playlist information shown in FIG. 3. That is, the reproduction requirement acquirer 203 acquires the value of the "service" in the playlist information as the reproduction requirement.

The reproduction enabling condition acquirer 205 acquires reproduction enabling condition information indicating a condition for enabling the reproduction on the own device (namely, device 20 including the controller 21 configured to execute the above-mentioned processing). In this case, examples of the condition for enabling the reproduction of content (hereinafter referred to as "reproduction enabling condition") include the format supported by the device 20, the sampling rate or the bit rate supported by the device 20, and the name or other such information on the service for which the device 20 has a use authorization. The wording "supported by the device 20" indicates that the content can be reproduced by the device 20.

The reproduction enabling condition information is stored in, for example, the storage 22, and the reproduction enabling condition acquirer 205 reads out the reproduction enabling condition information from the storage 22. The reproduction enabling condition information may be stored in, for example, a server computer on the Internet 6 to be acquired from the server computer.

Figure 6:
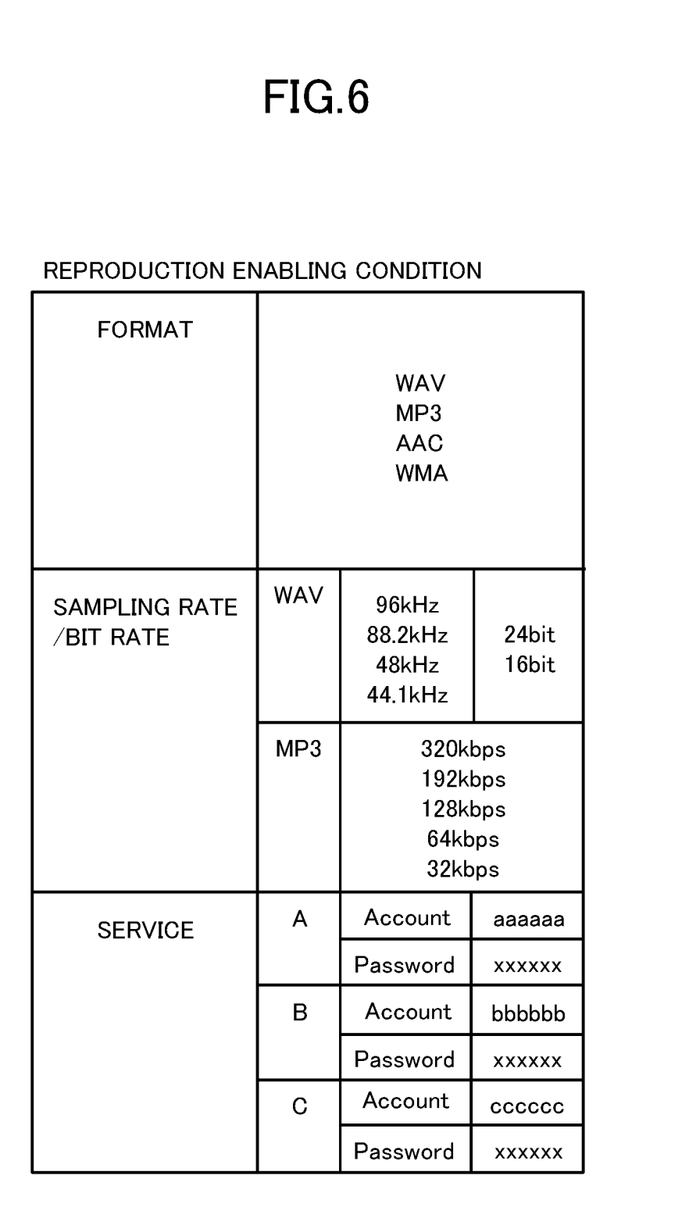
FIG. 6 is a table for showing reproduction enabling condition information.

As shown in FIG. 6, the reproduction enabling condition information includes the items of a "format", a "sampling rate/bit rate", and a "service". In the "format", types of formats (for example, WAV, MP3, AAC, and WMA) supported by the device 20 are described.

In the "sampling rate/bit rate", a plurality of sampling rates (for example, 44.1 kHz and 16 bits) or a plurality of bit rates (for example, 128 kbps) supported by the device 20 are described for each format. The sampling rate or the bit rate supported by the device 20 may be described in the form of, for example, a numerical range.

In the "service", the name or other such information on the service for which the device 20 has a use authorization is described. Specifically, in the "service", the names (for example, A, B, and C) of the services for which the device 20 has a use authorization are described together with account information and its password to be used for accessing the external server 40 for implementing the service.

The reproducibility determiner 207 determines whether or not each piece of content can be reproduced by the own device based on the reproduction requirement information acquired by the reproduction requirement acquirer 203 and the reproduction enabling condition information acquired by the reproduction enabling condition acquirer 205. That is, the reproducibility determiner 207 compares each of reproduction requirements required for reproducing each piece of content and each of reproduction enabling conditions that enable the piece of content to be reproduced on the own device with each other to determine that the piece of content can be reproduced when all the conditions match each other, and to determine that the piece of content cannot be reproduced when even one condition fails to match each other.

Specifically, the reproducibility determiner 207 determines whether the format (for example, MP3) of the content data matches any one of the types of formats (for example, WAV, MP3, AAC, and WMA) supported by the device 20.

The reproducibility determiner 207 also determines whether the sampling rate or the bit rate (for example, 128 kbps) of the content data matches any one of the sampling rates or the bit rates (for example, 320 kbps, 192 kbps, 128 kbps, 64 kbps, and 32 kbps) supported by the device 20. When the sampling rate or the bit rate supported by the device 20 is described in the form of a numerical range, the reproducibility determiner 207 may determine whether or not the sampling rate or the bit rate of the content data is included in the numerical range.

The reproducibility determiner 207 further determines whether the service (for example, service A) for providing the content data matches any one of the services (for example, the services A, B, and C) for which the device 20 has a use authorization.

The playlist editor 209 edits the playlist information based on a determination result obtained by the reproducibility determiner 207 so as to skip reproducing a piece of content that cannot be reproduced on the own device. Specifically, the playlist editor 209 deletes from the playlist information the piece of content that cannot be reproduced.

Figure 7A:
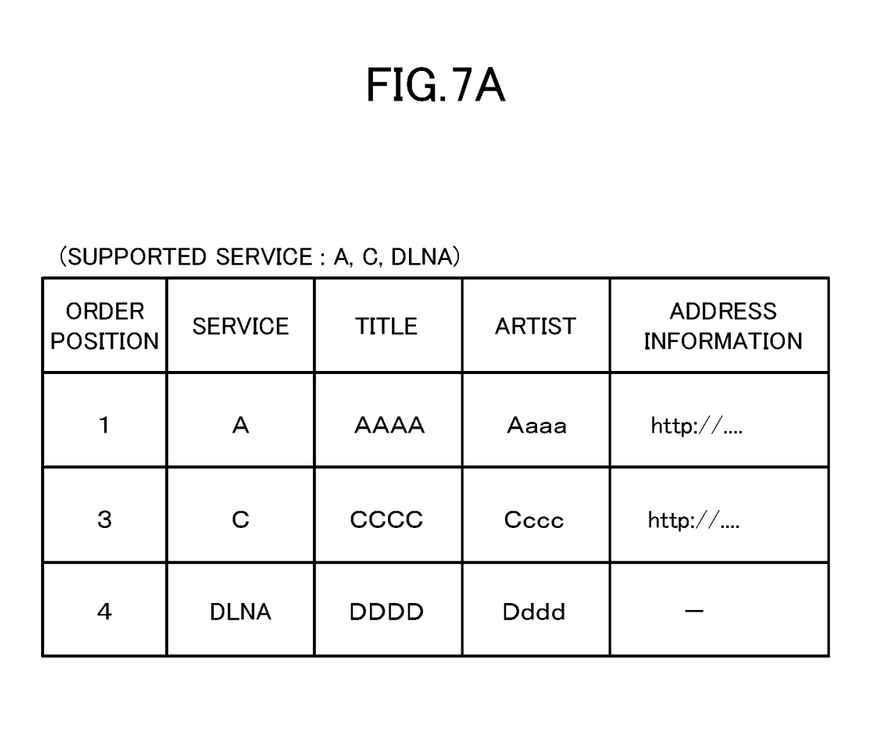
FIG. 7A is a table for showing an example of editing or generating the playlist information.
Figure 7B:
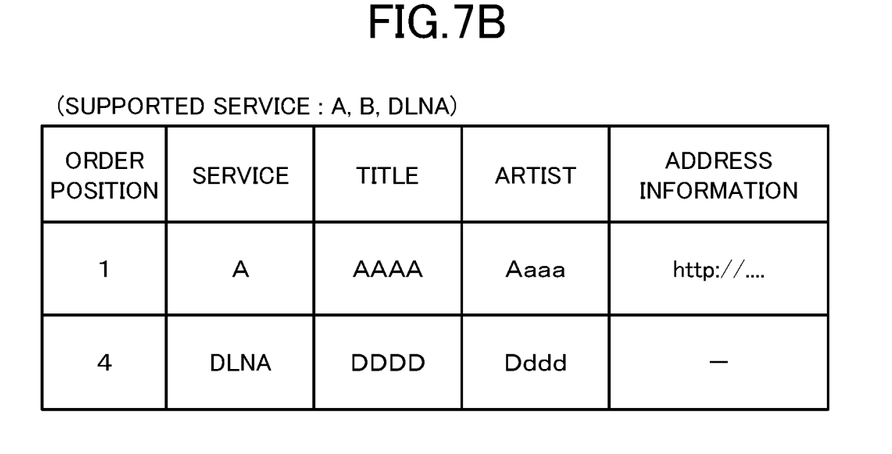
FIG. 7B is a table continuing from FIG. 7A.

FIG. 7A and FIG. 7B are tables for showing an example of deleting from the playlist information the piece of content that cannot be reproduced. In the example of FIG. 7A, there is shown playlist information obtained after the second device 20-2, which has no authorization to use the service B, deletes the second piece of content having the service B as the providing source (piece of content having the "title" being "BBBB" and the "artist" being "Bbbb") from the playlist information shown in FIG. 3. As a result of deleting the second piece of content, the first, third, and fourth pieces of content remain in the playlist information.

In the example of FIG. 7B, there is shown playlist information obtained after the third device 20-3, which has no authorization to use the service C, acquires the playlist information shown in FIG. 7A from the second device 20-2 and deletes the third piece of content having the service C as the providing source (piece of content having the "title" being "CCCC" and the "artist" being "Cccc") from the playlist information. As a result of deleting the second piece of content by the second device 20-2 and deleting the third piece of content by the third device 20-3, only the first and fourth pieces of content remain in the playlist information.

The playlist editor 209 may set a reproduction restriction flag for the piece of content that cannot be reproduced. Meanwhile, when the reproduction restriction flag is set for the content that can be reproduced on the own device, the playlist editor 209 may cancel the reproduction restriction flag.

Figure 8A:
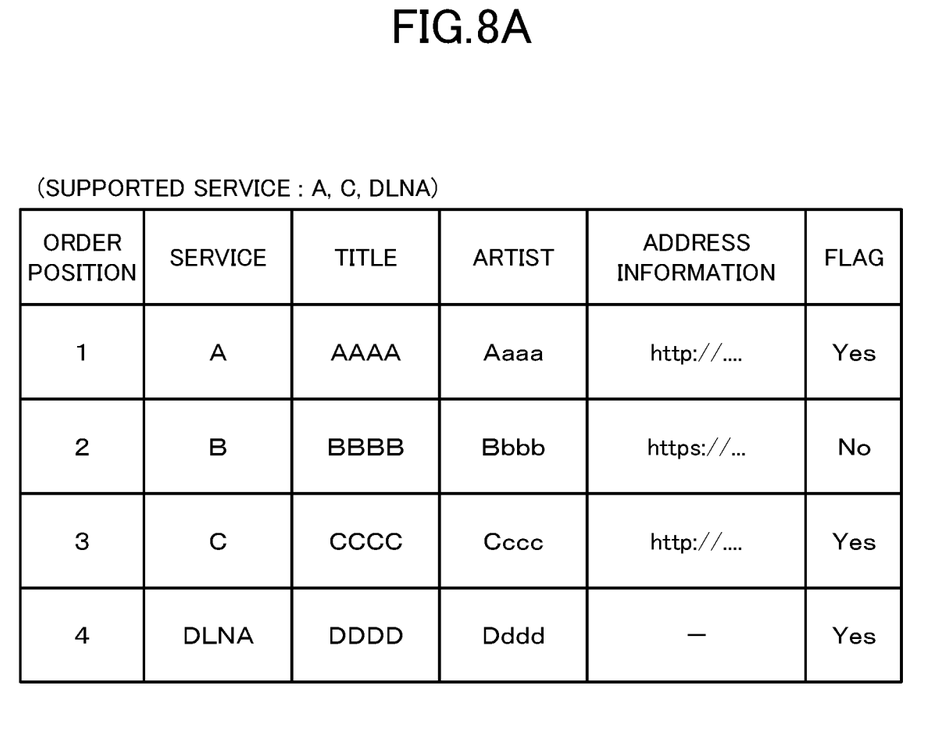
FIG. 8A is a table for showing another example of editing or generating the playlist information.
Figure 8B:
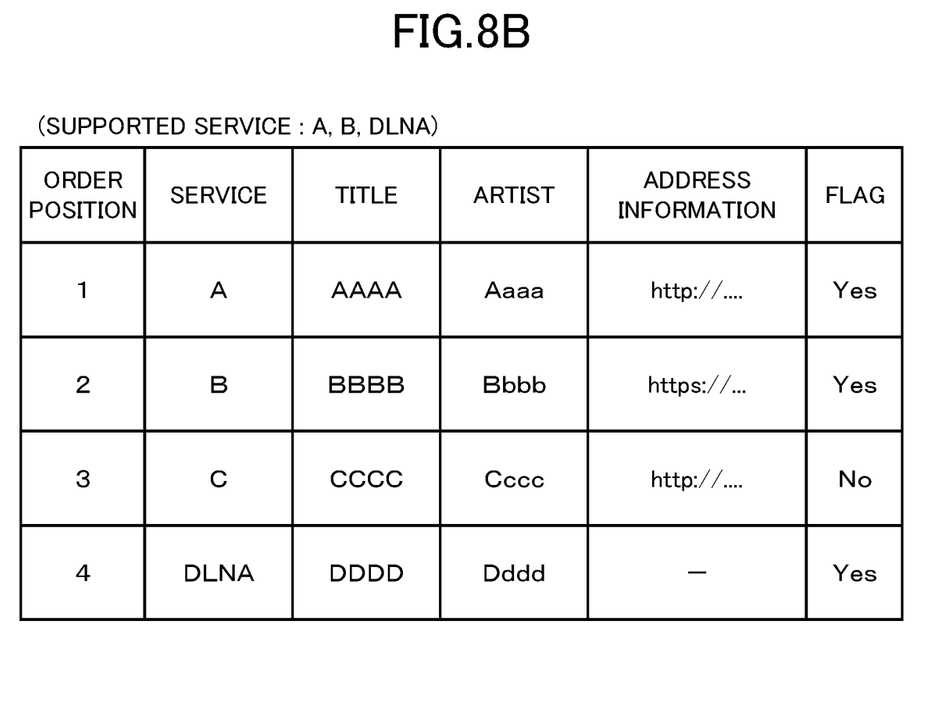
FIG. 8B is a table continuing from FIG. 8A.

FIG. 8A and FIG. 8B are tables for showing an example of setting a flag for restricting the reproduction for the piece of content that cannot be reproduced. In the example of FIG. 8A, there is shown playlist information obtained after the second device 20-2, which has no authorization to use the service B, sets the reproduction restriction flag ("No") for the second piece of content having the service B as the providing source (piece of content having the "title" being "BBBB" and the "artist" being "Bbbb"), which is included in the playlist information shown in FIG. 3.

In the example of FIG. 8B, there is shown playlist information obtained after the third device 20-3, which has an authorization to use the service B but has no authorization to use the service C, acquires the playlist information shown in FIG. 8A from the second device 20-2, cancels the reproduction restriction flag ("No") set for the second piece of content having the service B as the providing source (that is, resets the reproduction restriction flag to "Yes"), and sets the reproduction restriction flag ("No") for the third piece of content having the service C as the providing source (piece of content having the "title" being "CCCC" and the "artist" being "Cccc").

The controller 21 in at least one embodiment includes the playlist editor 209 configured to edit the playlist information acquired by the playlist acquirer 201, but may instead include a playlist generator configured to newly generate playlist information which is different from the edited playlist information in which the piece of content that cannot be reproduced on the own device is not reproduced.

The alternative content searcher 211 searches for an alternative piece of content to be used as a substitute for the piece of content that cannot be reproduced on the own device. After the alternative content searcher 211 retrieves the alternative piece of content, the playlist editor 209 replaces the piece of content that cannot be reproduced, which is included in the playlist information, by the alternative piece of content. Specifically, the alternative content searcher 211 uses the values of the "title" and the "artist" of the piece of content that cannot be reproduced, which are included in the playlist information shown in FIG. 3, as keys to search, for example, other services for an alternative piece of content.

Figure 9:
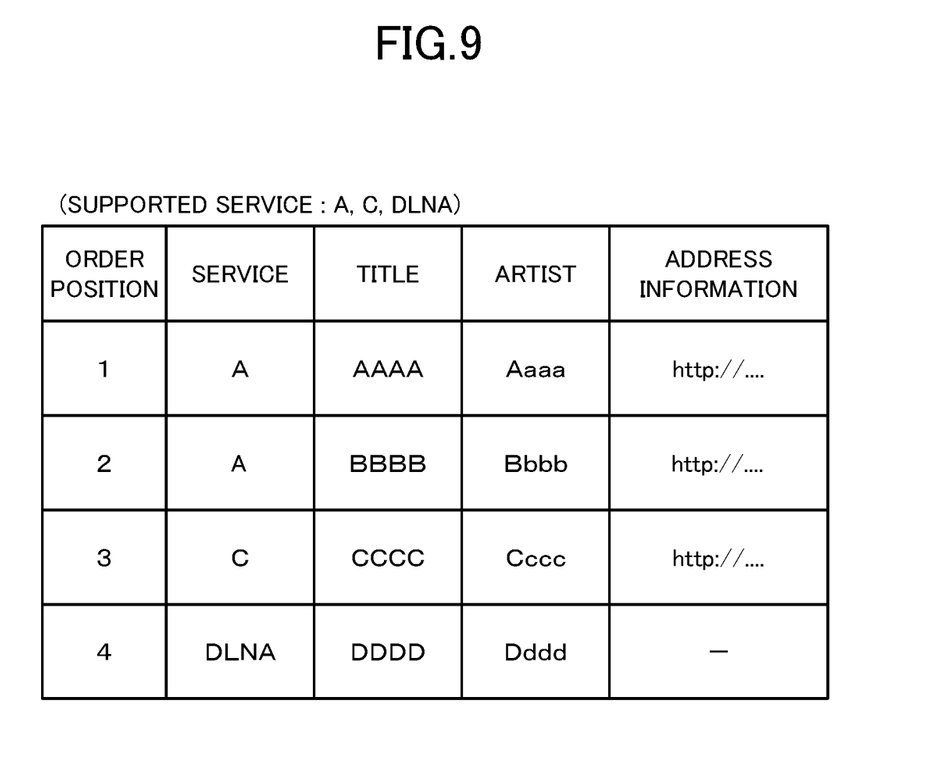
FIG. 9 is a table for showing still another example of editing or generating the playlist information.

FIG. 9 is a table for showing an example of replacing the piece of content that cannot be reproduced in the playlist information by the alternative piece of content. In the example of FIG. 9, there is shown playlist information obtained after the second device 20-2, which has no authorization to use the service B, replaces the second piece of content having the service B as the providing source, which is included in the playlist information shown in FIG. 3, by the alternative piece of content having the same values of the "title" and the "artist", which are retrieved from the service A. As a result of the replacement, the values of the "service" and the "address information" of the second piece of content is replaced by those of the service A.

The playlist storage 213 stores the playlist information edited by the playlist editor 209 (or playlist information generated by the playlist generator which is different from the edited playlist information) in the storage 22.

The device 20 reproduces the pieces of content based on the reproduction order position described in the edited playlist information (or generated playlist information which is different from the edited playlist information) stored in the storage 22. The playlist information has been edited or generated so as to skip reproducing the piece of content that cannot be reproduced on the own device, and hence the device 20 skips reproducing the piece of content that cannot be reproduced on the own device and reproduces the other pieces of content.

For example, in a case of using the playlist information shown in FIG. 7A, the second piece of content has been deleted, and hence the device 20 reproduces the third piece of content after finishing reproducing the first piece of content. The device 20 also reproduces the third piece of content when receiving an instruction for a shift to the next piece of content (so-called a skip to the next song) from, for example, an operating element (not shown) during the reproduction of the first piece of content.

Meanwhile, in a case of using the playlist information shown in FIG. 8A, when receiving an instruction for a shift to the next piece of content (so-called instruction to skip to the next song) from, for example, an operating element (not shown) after finishing reproducing the first piece of content or during the reproduction, the device 20 skips reproducing the second piece of content for which the reproduction restriction flag ("No") is set, and reproduces the third piece of content, which is the next piece of content for which the reproduction restriction flag is not set.

With the above-mentioned configuration, the device 20 is not required to attempt to reproduce the piece of content that cannot be reproduced or use a memory in order to load the content data every time the playlist information is used, and hence it is possible to suppress waste due to the piece of content that cannot be reproduced.

The above description has been given by taking an example of storing and using the playlist information edited or generated so as to skip reproducing the piece of content that cannot be reproduced on the own device, but the example of the information based on the determination result is not limited thereto. For example, reproducibility information (information on the "flag" field shown in FIG. 8A and FIG. 8B) indicating whether the piece of content can be reproduced or cannot be reproduced may be generated and stored separately from the playlist information based on the determination result, and both the playlist information and the reproducibility information may be used when the piece of content is to be reproduced.

[3-1. Processing]

Figure 10:
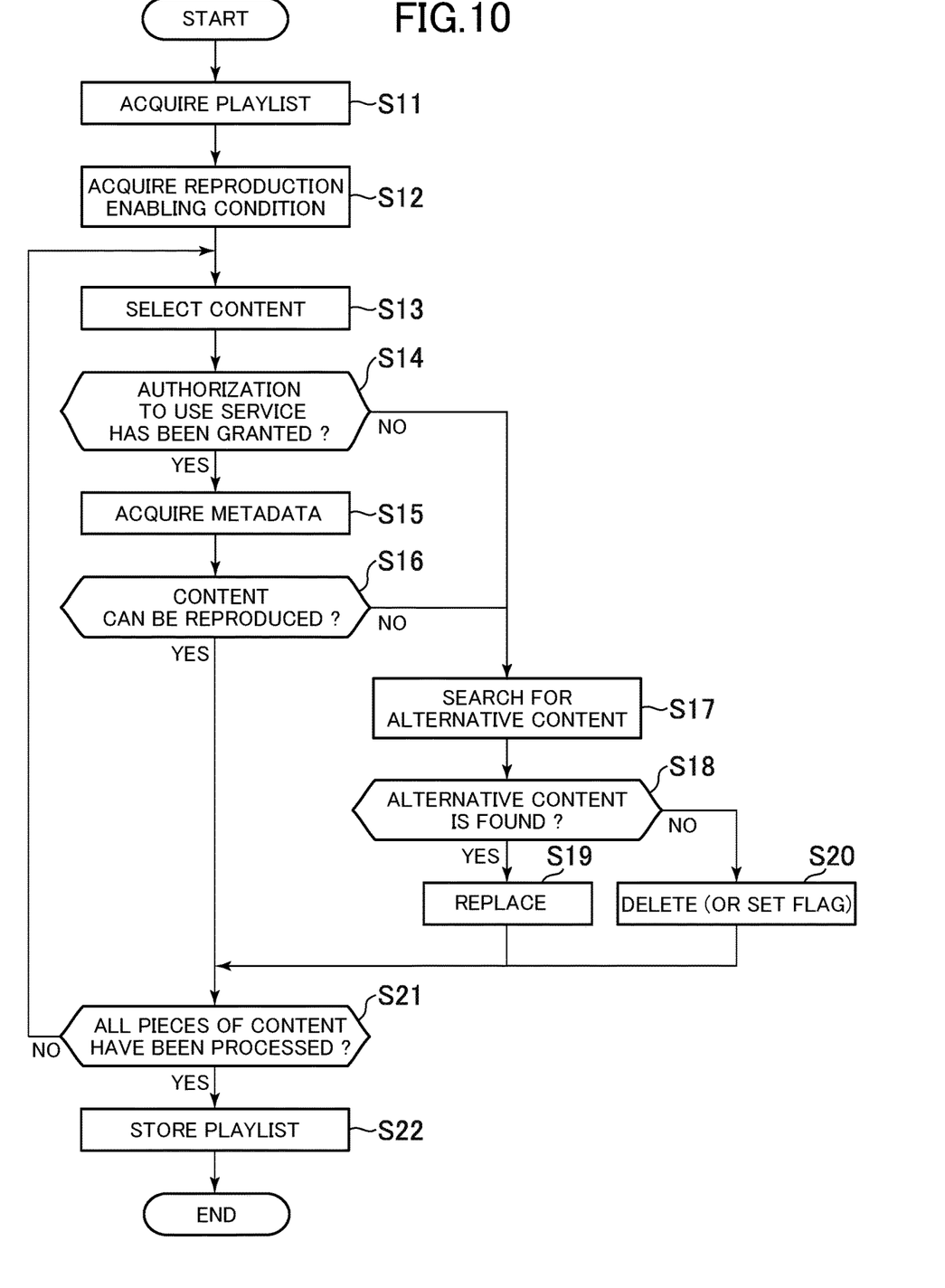
FIG. 10 is a flowchart for illustrating a processing example of a content reproduction method according to at least one embodiment.

FIG. 10 is a flowchart for illustrating a processing example of a content reproduction method. The controller 21 executes processing illustrated in FIG. 10 in accordance with the program, to thereby function as the playlist acquirer 201, the reproduction requirement acquirer 203, the reproduction enabling condition acquirer 205, the reproducibility determiner 207, the playlist editor 209, the alternative content searcher 211, and the playlist storage 213.

First, the controller 21 acquires playlist information (Step S11), and acquires reproduction enabling condition information (Step S12). The playlist information shown in FIG. 3 and the reproduction enabling condition information shown in FIG. 6 are, for example, stored in the storage 22, and are read out from the storage 22 by the controller 21.

Subsequently, the controller 21 selects one piece of content from the pieces of content included in the playlist information (Step S13). In this case, for example, the first piece of content is selected.

Subsequently, the controller 21 determines whether or not an authorization to use a service relating to the selected piece of content has been granted (Step S14). Specifically, the controller 21 reads out the name or other such information on the service for providing the content data from the playlist information, and refers to the reproduction enabling condition information to determine whether or not an authorization to use the service has been granted. When the service relating to the selected piece of content is DLNA, the controller 21 determines that an authorization to use the service has been granted.

When determining that a use authorization has been granted (YES in Step S14), the controller 21 acquires metadata relating to the selected piece of content (Step S15). Specifically, the controller 21 reads out the account information and its password to be used for using the service relating to the selected piece of content from the storage 22, and accesses the external server 40 for implementing the service to acquire the metadata relating to the selected piece of content. When the service relating to the selected piece of content is DLNA, the controller 21 accesses the DLNA server 30 to acquire the metadata.

Subsequently, the controller 21 determines based on the acquired metadata whether or not the selected piece of content can be reproduced (Step S16). Specifically, the controller 21 reads out the format of the content data and the sampling rate or the bit rate from the acquired metadata, and refers to the reproduction enabling condition information to determine whether or not those pieces of information are supported on the own device.

When determining that a use authorization has not been granted (NO in Step S14) or determining that the selected piece of content cannot be reproduced (NO in Step S16), the controller 21 searches for an alternative piece of content to be used as a substitute for the selected piece of content (Step S17). Specifically, the controller 21 searches a service other than the service relating to the selected piece of content (the service to be searched is a service for which the device 20 has a use authorization) for a piece of content having the same title, artist, or other such attributes as those of the selected piece of content. The controller 21 may search the DLNA server 30 for the alternative piece of content. Although not shown, the controller 21 determines whether or not the alternative piece of content can be reproduced in the same manner as in Step S15 and Step S16.

When an alternative piece of content is found (YES in Step S18), the controller 21 edits the playlist information so as to replace the selected piece of content by the alternative piece of content (Step S19). Meanwhile, when the alternative piece of content is not found (NO in Step S18), the controller 21 edits the playlist information so as to skip reproducing the selected piece of content (Step S20). For example, the controller 21 deletes the selected piece of content from the playlist information. In another case, the controller 21 may set a reproduction inhibition flag for the selected piece of content. When the reproduction inhibition flag is set for a piece of content determined to be reproducible, the controller 21 cancels the reproduction inhibition flag.

The controller 21 executes the above-mentioned processing from Step S13 to Step S20 on all the pieces of content included in the playlist information (NO in Step S21), and after completing the execution of the processing on all the pieces of content (YES in Step S21), stores the edited playlist information in the storage (Step S22), to thereby bring the processing to an end.

The controller 21 may be configured to display on the display 24 a message for inquiring of a user whether or not to permit the replacement by the alternative piece of content, and when receiving from the user a selection of permission of the replacement, perform the replacement by the alternative piece of content. The display relating to the permission of the replacement and the reception of the selection may be performed in units of pieces of content, or may be performed on an entire playlist. In another case, the controller 21 may be configured to hold in advance the setting of whether or not to permit the replacement by the alternative piece of content, and when the replacement is permitted, perform the replacement by the alternative piece of content.

The controller 21 executes the above-mentioned processing from Step S11 to Step S22 when the playlist information is acquired from another device 20 or other such source. The authorization to use the service may be changed when, for example, a new authorization to use the service is acquired after the execution of the above-mentioned processing, and hence the controller 21 may periodically execute the above-mentioned processing in order to handle the change of the authorization to use the service. In another case, the controller 21 may execute the above-mentioned processing with the acquisition of a new authorization to use the service being used as a trigger.

[3-2. Processing]

Figure 11:
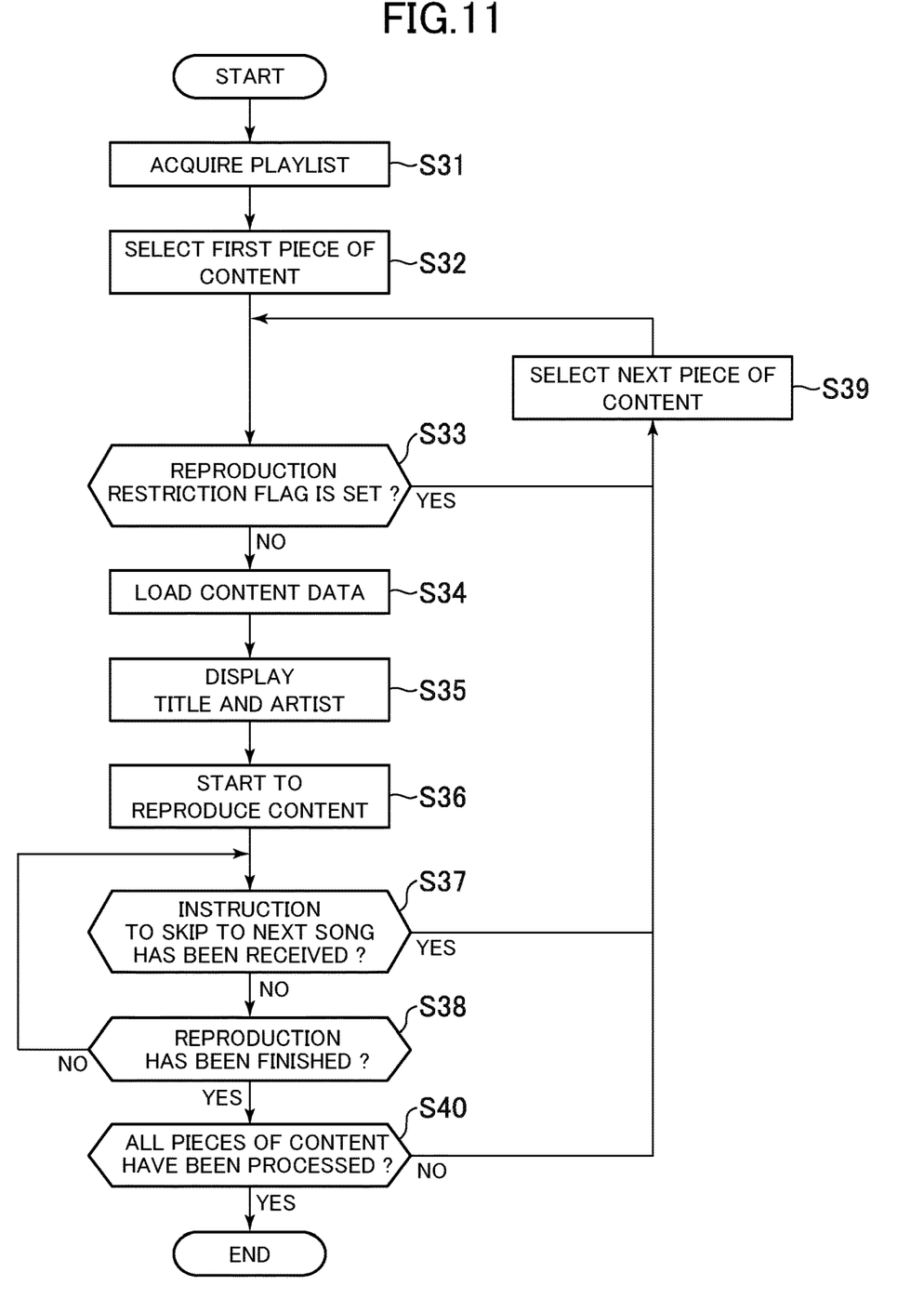
FIG. 11 is a flowchart for illustrating a processing example of the content reproduction method according to at least one embodiment.

FIG. 11 is a flowchart for illustrating a processing example of the content reproduction method. In the example of FIG. 11, there is illustrated processing to be performed when the playlist information including a "flag" field for setting or canceling the reproduction restriction flag shown in FIG. 8A and FIG. 8B is used to reproduce content.

First, the controller 21 acquires playlist information (Step S31). The "playlist information" referred to herein is the playlist information edited or generated by the processing illustrated in FIG. 10. The controller 21 reads out the edited or generated playlist information from the storage 22.

Subsequently, the controller 21 selects the first piece of content from the pieces of content included in the playlist information (Step S32).

Subsequently, the controller 21 determines whether or not the reproduction restriction flag is set for the selected piece of content (Step S33). Specifically, the controller 21 refers to the value of the "flag" field in the playlist information to determine that the reproduction restriction flag is set when the value is "No", and the reproduction restriction flag is not set when the value is "Yes".

When the reproduction restriction flag is set (YES in Step S33), the controller 21 selects the next piece of content (Step S39) to determine whether or not a reproduction restriction flag is set for the newly selected piece of content (Step S33).

When the reproduction restriction flag is not set (NO in Step S33), the controller 21 loads the content data on the selected piece of content (Step S34). Specifically, the controller 21 identifies the providing source of the selected piece of content from the values of the "service" and the "address information" in the playlist information, uses the values of the "title" and the "artist" as keys to acquire the content data, and loads the content data into an area for reproduction included in the storage 22. Then, the controller 21 displays the information of the title and the artist of the content on the display 24 (Step S35), and starts to reproduce the piece of content (Step S36).

The controller 21 continues to determine, until the reproduction of the content is finished, whether or not the instruction to skip to the next song, which is an instruction for a shift to the next piece of content, has been received (Step S37 and Step S38). When the instruction to skip to the next song has been received (YES in Step S37), the controller 21 selects the next piece of content (Step S39) to determine whether or not a reproduction restriction flag is set for the newly selected piece of content (Step S33). Also when the reproduction of the content is finished (YES in Step S38 and NO in Step S40), the controller 21 selects the next piece of content (Step S39) to determine whether or not a reproduction restriction flag is set for the newly selected piece of content (Step S33).

The controller 21 executes the above-mentioned processing from Step S31 to Step S39 on all the pieces of content included in the playlist information (NO in Step S40), and after completing the execution on all the pieces of content (YES in Step S40), brings the processing to an end.

While at least one embodiment of the present invention has been described above, it is to be understood that the present invention is not limited to at least one embodiment described above and may be subjected to various modifications by a person skilled in the art.

What is claimed is:

1. A content reproduction device comprising:
 a storage; and
 a controller configured to:
  acquire playlist information indicating a reproduction order position of plural pieces of content;
  acquire reproduction requirement information indicating a condition required for reproduction, including at least one a format or a sampling or bit rate of each of the plural pieces of content;
  acquire reproduction enabling condition information indicating a condition for enabling the reproduction, including at least one of a format or a sampling or bit rate for reproduction, on the content reproduction device;
  determine, based on the reproduction requirement information and the reproduction enabling condition information, whether each of the plural pieces of content is reproducible on the content reproduction device;
  store, in the storage, information that is based on a determination result obtained by the controller; and
  skip reproducing one of the plural pieces of content that is irreproducible, due to an incompatible format or an incompatible sampling or bit rate, on the content reproduction device in accordance with the information that is based on the determination result and reproduce another one of the plural pieces of content that is reproducible on the content reproduction device in accordance with the information.

2. The content reproduction device according to claim 1, wherein the controller is configured to:
 edit the playlist information to skip reproducing the one of the plural pieces of content that is irreproducible, and
 store, in the storage, the edited playlist information as the information that is based on the determination result.

3. The content reproduction device according to claim 2, wherein the controller is configured to delete from the playlist information the one of the plural pieces of content that is irreproducible.

4. The content reproduction device according to claim 2, wherein the controller is configured to set a flag for restricting the reproduction of the one of the plural pieces of content that is irreproducible.

5. The content reproduction device according to claim 4, wherein the controller is configured to cancel the flag when the flag is set for one of the plural pieces of content that is reproducible on the content reproduction device.

6. The content reproduction device according to claim 1, wherein the controller is configured to:
 generate playlist information that is different from the edited playlist information to skip reproducing the one of the plural pieces of content that is irreproducible, and
 store, in the storage, the generated playlist information as the information that is based on the determination result.

7. The content reproduction device according to claim 1, wherein the condition required for the reproduction and the condition for enabling the reproduction relate to an authorization to use a service for providing content data.

8. The content reproduction device according to claim 1, wherein the condition required for the reproduction includes an authorization to use a service for providing content data on each of the plural pieces of content.

9. The content reproduction device according to claim 1, wherein the condition for enabling the reproduction includes a service for which the content reproduction device has a use authorization.

10. The content reproduction device according to claim 2, wherein the controller is configured to acquire the reproduction requirement information from metadata on content data.

11. The content reproduction device according to claim 2, wherein the controller is configured to:
 search for an alternative piece of content to be used as a substitute for the one of the plural pieces of content that is irreproducible; and
 replace the one of the plural pieces of content that is irreproducible by the alternative piece of content.

12. The content reproduction device according to claim 1, further comprising a communicator configured to acquire the playlist information from another device.

13. A content reproduction method comprising:
acquiring playlist information indicating a reproduction order position of plural pieces of content;
acquiring reproduction requirement information indicating a condition required for reproduction, including at least one of a format or a sampling or bit rate, of each of the plural pieces of content;
acquiring reproduction enabling condition information indicating a condition for enabling the reproduction, including at least one of a format or a sampling or bit rate for reproduction, on a content reproduction device;
determining, based on the reproduction requirement information and the reproduction enabling condition information, whether each of the plural pieces of content is reproducible on the content reproduction device;
storing, in a storage device, information that is based on a determination result; and
skipping reproducing one of the plural pieces of content that is irreproducible, due to an incompatible format or an incompatible sampling or bit rate, on the content reproduction device in accordance with the information that is based on the determination result and reproducing another one of the plural pieces of content that is reproducible on the content reproduction device in accordance with the information.

14. The content reproduction method according to claim 13, further comprising:
editing the playlist information to skip reproducing the one of the plural pieces of content that is irreproducible; and
storing, in the storage, the edited playlist information as the information that is based on the determination result.

15. The content reproduction method according to claim 14, further comprising deleting from the playlist information the one of the plural pieces of content that is irreproducible.

16. The content reproduction method according to claim 14, further comprising setting a flag for restricting the reproduction of the one of the plural pieces of content that is irreproducible.

17. The content reproduction method according to claim 16, further comprising canceling the flag when the flag is set for one of the plural pieces of content that is reproducible on the content reproduction device.

18. The content reproduction method according to claim 13, further comprising:
generating playlist information that is different from the edited playlist information to skip reproducing the one of the plural pieces of content that is irreproducible; and
storing, in the storage, the generated playlist information as the information that is based on the determination result.

19. A content reproduction system comprising:
a first content reproduction device including:
a first storage; and
a first controller configured to:
acquire playlist information indicating a reproduction order position of plural pieces of content;
acquire reproduction requirement information indicating a condition required for reproduction, including at least one of a format or a sampling or bit rate, of each of the plural pieces of content;
acquire first reproduction enabling condition information indicating a condition for enabling the reproduction, including at least one of a format or a sampling or bit rate for reproduction, on the first content reproduction device;
determine based on the reproduction requirement information and the first reproduction enabling condition information whether each of the plural pieces of content is reproducible on the first content reproduction device;
store, in the first storage, information that is based on a determination result obtained by the first controller; and
skip reproducing one of the plural pieces of content that is irreproducible, due to an incompatible format or an incompatible sampling or bit rate, on the first content reproduction device in accordance with the information that is based on the determination result and reproduce another one of the plural pieces of content that is reproducible on the content reproduction device in accordance with the information; and
a second content reproduction device including a second controller configured to acquire the information that is based on the determination result from the first content reproduction device.

20. The content reproduction system according to claim 19, further comprising:
a second storage,
wherein the second controller is configured to:
acquire the playlist information edited skip reproducing one of the plural pieces of content that is irreproducible or playlist information generated to skip reproducing the one of the plural pieces of content that is irreproducible that is different from the edited playlist information from the first content reproduction device as the information that is based on the determination result;
acquire the reproduction requirement information indicating the condition required for the reproduction of each of the plural pieces of content, which is included in the edited playlist information or the generated playlist information;
acquire second reproduction enabling condition information indicating a condition for enabling the reproduction on the second content reproduction device;
determine based on the reproduction requirement information and the second reproduction enabling condition information whether each of the plural pieces of content is reproducible on the second content reproduction device;
store, in the second storage, information that is based on a determination result obtained by the second controller; and
skip reproducing one of the plural pieces of content that is irreproducible on the second content reproduction device in accordance with the information that is based on the determination result obtained by the second controller when the plural pieces of content is reproduced.

* * * * *